(No Model.)

C. M. BONNEAU.
COOKING UTENSIL.

No. 300,839. Patented June 24, 1884.

WITNESSES.
J. Henry Taylor.
James F. Bligh.

INVENTOR.
Christopher M. Bonneau
by Alex. P. Browne
Attorney

N. PETERS. Photo-Lithographer. Washington, D. C.

UNITED STATES PATENT OFFICE.

CHRISTOPHER M. BONNEAU, OF BOSTON, MASSACHUSETTS.

COOKING UTENSIL.

SPECIFICATION forming part of Letters Patent No. 300,839, dated June 24, 1884.

Application filed October 25, 1883. (No model.)

*To all whom it may concern:*

Be it known that I, CHRISTOPHER M. BONNEAU, of Boston, in the county of Suffolk and State of Massachusetts, and a citizen of the United States, have invented certain new and useful Improvements in Cooking Utensils, of which the following is a specification.

My invention relates, particularly, to that class of cooking utensils used in cooking fish and other articles of food by boiling or baking, wherein it is desirable that the cooked substance should be served or dished for the table without breaking. For this purpose there has heretofore been employed a tray on which the raw fish is placed, and which is then set in the kettle or other vessel. This tray, as heretofore constructed, has been made in one piece, and the cooked fish has been slid or lifted from it onto the dish in which it is served; but in the use of such a tray there is great risk of breaking or marring the cooked fish in the act of transferring from the tray to the dish.

My present invention has for its object to provide an improved tray so constructed that the transfer of the fish may be readily accomplished without any danger of injuring it.

My improved fish-tray is preferably made of perforated sheet metal. This tray is made in detachable sections, held together during the operations of cooking the fish and removing it from the cooker. After the tray has been placed upon the dish on which the fish is to be served, the sections are detached and separately drawn out from under the fish, which is thus deposited upon the dish without being broken or marred.

Figure 1:
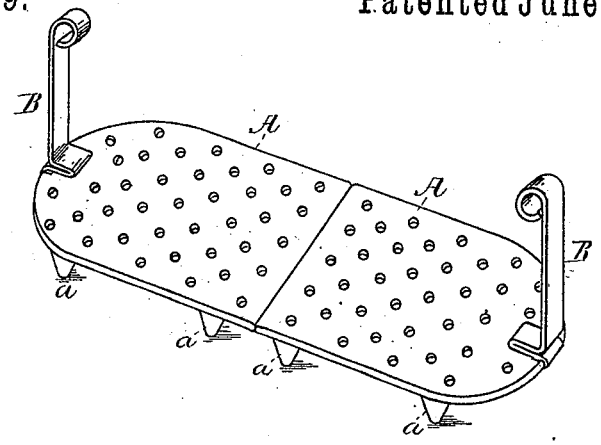
Figure 2:
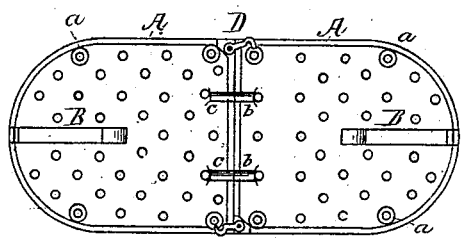
Figure 3:
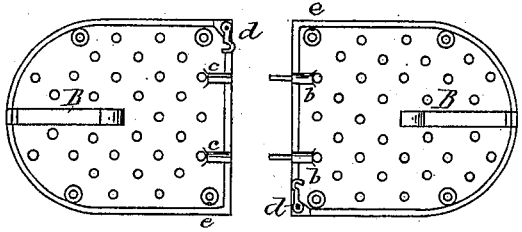
Figure 4:
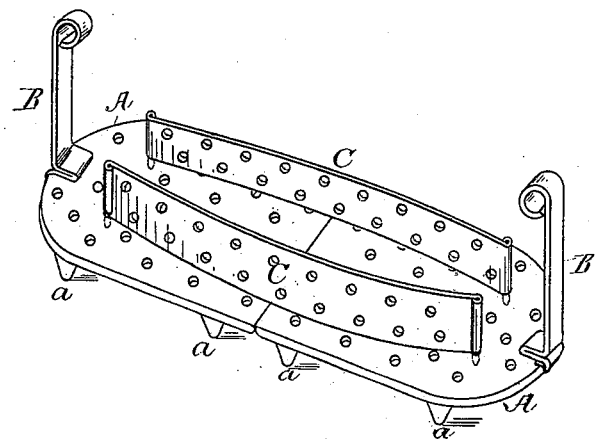

In the accompanying drawings, Figure 1 shows in perspective a fish-tray embodying my invention in the best form now known to me. Figs. 2 and 3 illustrate a convenient mode of fastening or keeping the fish-tray in place during the cooking and lifting-out operations, and of separating its parts when the dishing or serving is to take place. These views show the bottom of the tray in plan, and also the arrangement of the handles or lifters by which compact packing is made possible. Fig. 4 shows a perspective view of the tray when provided with adjustable or detachable retaining parts, as will be hereinafter described.

I will now proceed to describe the improved fish-tray represented in the drawings.

A A represent a flat tray or sheet of perforated metal, provided with suitable standards or supports, $a$, and with handles or lifting attachments B, arranged to project vertically from the tray for use in lifting it, and be folded back and out of the way when the tray is to be packed for transportation. These two parts A A are held together by means of pins $b$ on the under side of one part of the tray, which engage with slots $c$ on the other part of the tray. When it is desired to hold the article being cooked in a given position, I make use of retaining-walls C C, which may be of metal, and perforated like the bottom of the tray. For the convenient adjustable attachment of these retaining-walls, I provide them at their ends with projections, which enter the perforations in the bottom of the tray, and by making the walls C C of resilient metal and bending them slightly before inserting the projections the resilience in the metal holds the retaining-wall firmly enough in its place to support the article to be cooked. To prevent the two parts of the tray from being separated or forced apart by the resilient force of the retaining-walls, I provide suitable locks, as shown at D D. These locks may be conveniently formed by attaching swing-hooks $d$ to the opposed portions of the tray, which swinging hooks are made to engage with slots in the standards, as shown at Figs. 2 and 3.

It is obvious that any convenient means of temporarily connecting the two parts of the tray so as to hold it together in lifting the fish may be substituted for the pins and slots shown, and that any other convenient form of lock may be employed in place of the hooks and slots $d\,e$. No lock, however, will be required where the retaining-strips C are so constructed as not to tend to force open the two parts of the tray when set in place.

I am aware that dishes or trays have heretofore been made with parts hinged together so as to swing apart, and I make no claim to such a construction, my cooking device being a tray constructed of two parts adapted to be separated from each other by drawing apart in straight lines, and to be connected by pushing the parts together in a similar way.

I claim—

1. As a new article of manufacture, a fish-tray formed in detachable sections, adapted to be separated in a straight line, substantially as and for the purposes set forth.

2. A fish-tray formed in detachable sections, adapted to be separated in a straight line, and having suitable devices for holding the sections together to sustain the weight of the article to be cooked, but permitting their separation when it is desired to deposit it on the dish.

3. The combination, with a fish-tray composed of sections adapted to be separated in a straight line, of retaining devices for keeping the article to be cooked in the desired position.

4. The combination, with a perforated fish-tray, of retaining devices provided with projections adapted to be inserted in the perforations of the tray, and thereby hold the retaining devices in position, substantially as set forth.

5. The combination, with the separable and detachable two-part fish-tray A A, of the retaining devices C and suitable locking devices, D, substantially as set forth.

6. The divided fish-tray A A, composed of detachable bottom sections, and provided with the knockdown-handles B B, hinged thereto, so as to permit their being firmly packed upon the tray in packing, substantially as described.

In testimony whereof I have hereunto subscribed my name this 19th day of October, A. D. 1883.

CHRISTOPHER M. BONNEAU.

Witnesses:
M. J. LOWE,
J. HENRY TAYLOR.